United States Patent [19]

Sajatovic

[11] Patent Number: 5,593,603

[45] Date of Patent: Jan. 14, 1997

[54] METHOD FOR PRODUCING HARDENED FLUTES IN A KELLY BAR

[75] Inventor: James N. Sajatovic, Nazareth, Pa.

[73] Assignee: Ingersoll-Rand Company, Woodcliff Lake, N.J.

[21] Appl. No.: 465,487

[22] Filed: Jun. 5, 1995

[51] Int. Cl.⁶ .................................................. B23K 9/013
[52] U.S. Cl. .................................................. 219/69.1
[58] Field of Search .................. 219/68, 69.1; 148/565, 148/566

[56] References Cited

U.S. PATENT DOCUMENTS

| | | | |
|---|---|---|---|
| 3,240,639 | 3/1966 | Lihl | 148/565 |
| 3,840,718 | 10/1974 | Myers | 219/68 |
| 4,154,565 | 5/1979 | Hyde et al. | 148/565 |
| 4,950,863 | 8/1990 | Gilliland | 219/69.1 |
| 5,062,490 | 11/1991 | Rassieur | |
| 5,368,083 | 11/1994 | Beck, III | |

FOREIGN PATENT DOCUMENTS 77392  10/1970  Germany .

*Primary Examiner*—Geoffrey S. Evans
*Attorney, Agent, or Firm*—John J. Selko

[57] ABSTRACT

A method for processing a carbon steel body by electric arc gouging with a carbon electrode to create flutes with a hardened heat zone containing finely dispersed martensite beneath the bottom surface of each flute. This process can form a kelly bar having hardened flutes for improved wear. Preferably the carbon steel body composition is according to the AISI 4130 standard.

9 Claims, 3 Drawing Sheets

METHOD FOR PRODUCING HARDENED FLUTES IN A KELLY BAR

BACKGROUND OF THE INVENTION

This invention relates generally to kelly bars used in rotary drilling operations, and more particularly to kelly bars having hardened flutes therein for improved wear.

Kelly bars are currently produced using a milling process to produce the flute pattern along the length of the bar. The machining process is slow, and, the microstructure of the body of the kelly bar remains substantially unhardened by the milling process. It would be advantageous to provide a kelly bar and method of production to produce a kelly bar having hardened flutes for improved wear.

The foregoing illustrates limitations known to exist in present kelly bars and production methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a kelly bar having an elongated carbon steel body with an outer surface to be fluted, the body terminating in a first end and a second end; and gouging a plurality of flutes in the outer surface with a carbon electrode and an electric arc, each flute extending axially lengthwise along the body substantially the distance between the first and second end, each flute extending radially inwardly into the body and terminating at a curved bottom surface, each flute having a hardened, heat-affected zone beneath the bottom surface.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

In the drilling industry, kelly bars are used to transmit the twisting torque from the rotary machinery to the drill tool. The outside cross section of the kelly bar can be square, octagonal or round. The square and octagonal cross sections provide corners for the rotary table to grip and apply rotary force. Kelly bars having a round outside cross section must have flutes machined in the outer surface of the body to provide grooves for gripping by the rotary table.

Figure 1:
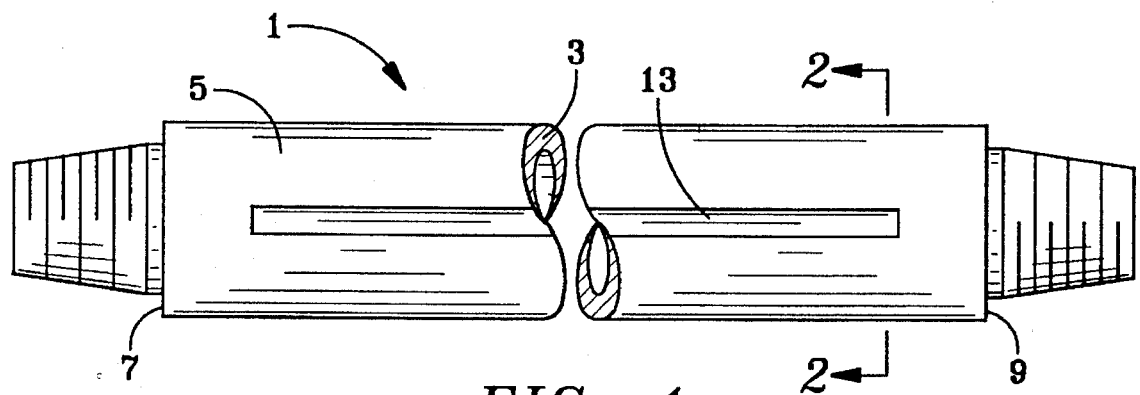
FIG. 1 is a side view of a kelly bar of this invention.
Figure 2:
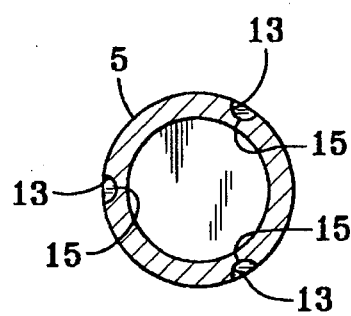
FIG. 2 is a view along B—B of FIG. 1.
Figure 3:
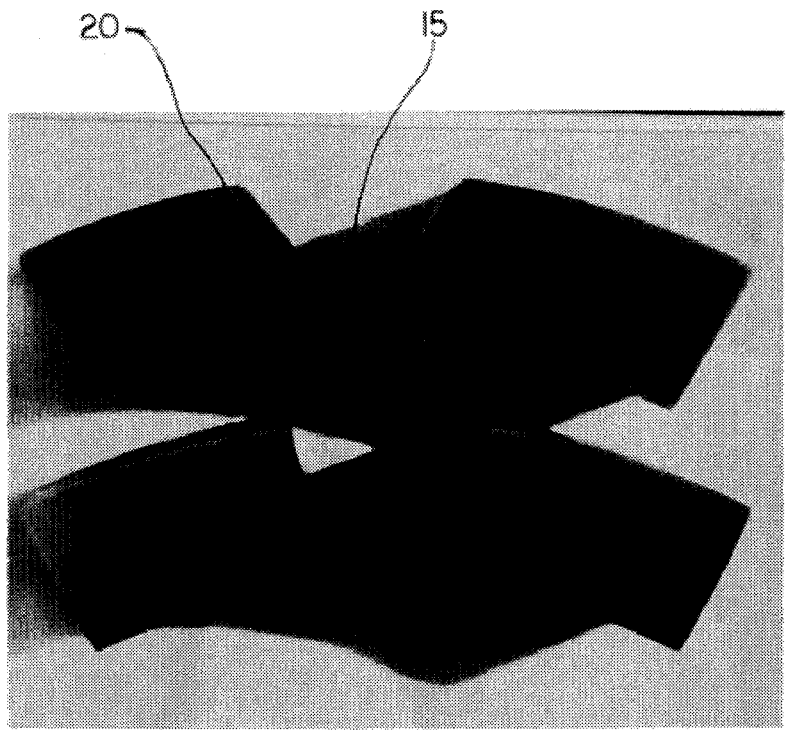
FIG. 3 is a photograph at 1.6× magnification, showing the heat-affected zone beneath a flute of the invention and the non heat-affected zone of a flute milled by prior art methods.
Figure 4:
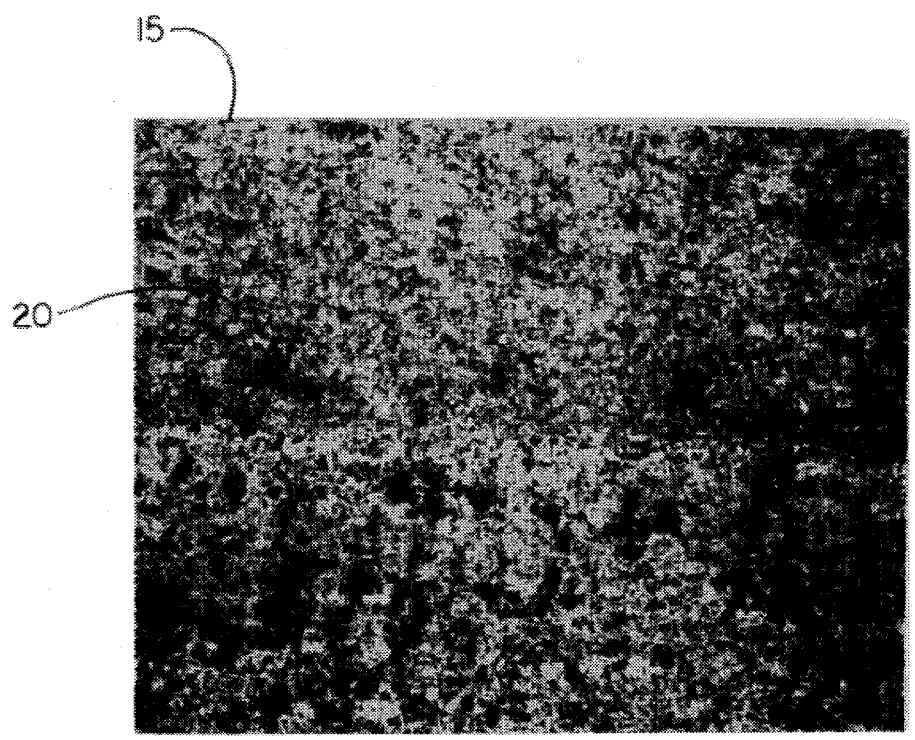
FIG. 4 is a photomicrograph at 100× magnification, showing the interface between a heat-affected zone and base metal.

FIG. 1 shows a kelly bar 1 having a hollow, tubular body 3 having an outer surface 5, and terminating in a first end 7 and a second end 9. A plurality of parallel, hardened flutes 13 are located in outer surface 5. Each flute 13 extends axially lengthwise along body 3 substantially the distance between first and second end, 7 and 9, respectively. As shown in FIG. 2, each flute 13 is a rounded groove, and extends radially inwardly into body 3 and terminates at a curved bottom surface 15. Each flute 13 has its greatest depth extending radially into body 3 and bottom surface 15 curves gradually upwardly and outwardly to As shown in FIGS. 3 and 4, each flute 13 has a hardened, heat-affected zone 20 beneath bottom surface 15. Heat-affected zone 20, will extend between 0.032 and 0.062 inches below bottom surface, when the method of this invention is used to produce flutes 13. As shown in FIG. 3, flute 13 does not have a heat-affected zone because it is produced by milling.

Figure 5:
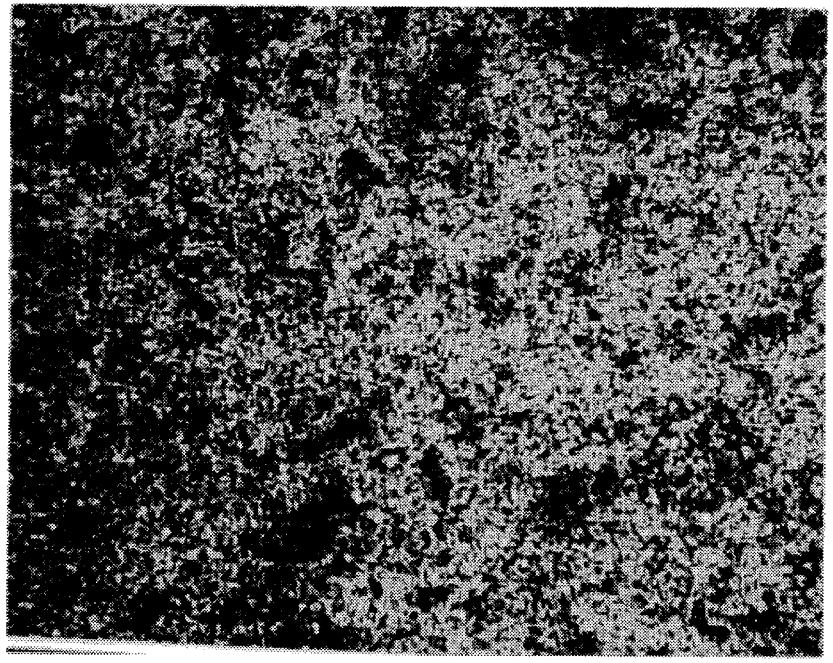
FIG. 5 is a photomicrograph at 400× magnification, showing the hardened martensitic microstructure in a heat-affected zone.
Figure 6:
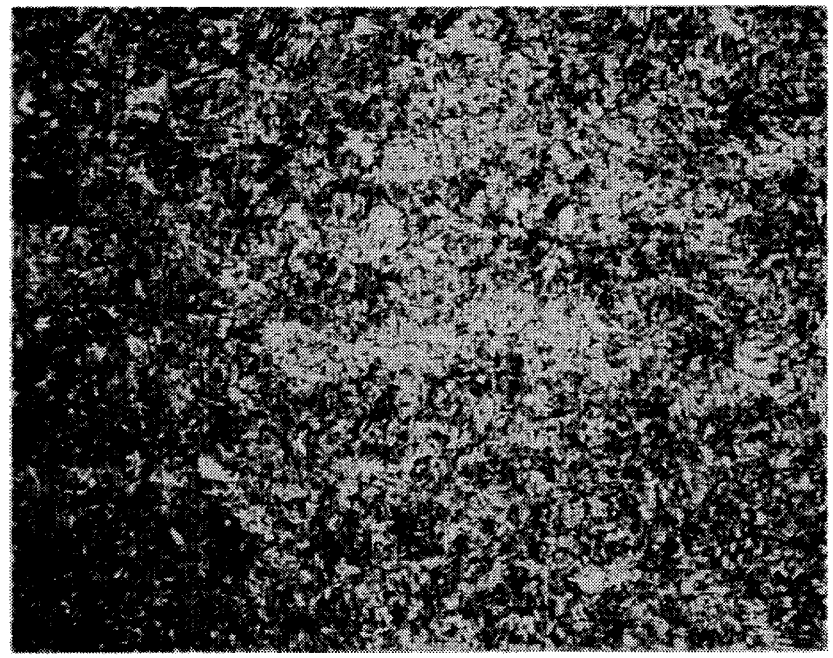
FIG. 6 is a photomicrograph at 400× magnification, showing the unhardened base metal microstructure adjacent to a flute milled according to prior art methods.

As shown in FIG. 5, body 3 has a first microstructure comprising finely dispersed martensite in heat-affected zone 20 adjacent to bottom surface 15. As shown in FIG. 6, body 3 has a second microstructure comprising a mixture of pearlite and bainite, away from the heat affected zone 20 and away from the bottom surface 15. This is also the same microstructure present in kelly bars before and after flutes 13 are milled therein.

The martensitic microstructure is produced by reason of the electric arc gouging method used to produce the flutes 13, as described hereinafter. The martensitic microstructure is harder and more wear resistant than the pearlitic/bainitic microstructure, providing an improved kelly bar. Conventional milling of flutes 13 will not produce the two different microstructures or the hardened heat-affected zone 20.

As is well known, kelly bars require specific strength properties, which dictate the composition of the material. It is preferred to use a carbon steel composition according to specification AISI 4130 which has the following weight percentage ranges of elements: C.28/.33; Mn.40/.60; P.035 max.; S.040 max.; Si.15/.30; Cr.80/1.10; Mo.15/.25; balance residuals.

Unfluted kelly bar bodies are initially supplied as elongated, hollow tubes. With the conventional compositions used for kelly bars in the industry, the hardening of flutes produced by the method of this invention will produce a range of flute hardness between 40 to 50 Rockwell C in the heat-affected zone 20. Away from heat affected zone 20 the microstructure hardness will be in the range of 28 to 332 Rockwell C.

I prefer a kelly bar with three flutes 13 spaced equidistant from each other around outer surface 3, as shown in FIG. 1. More or fewer flutes can be used.

Figure 7:
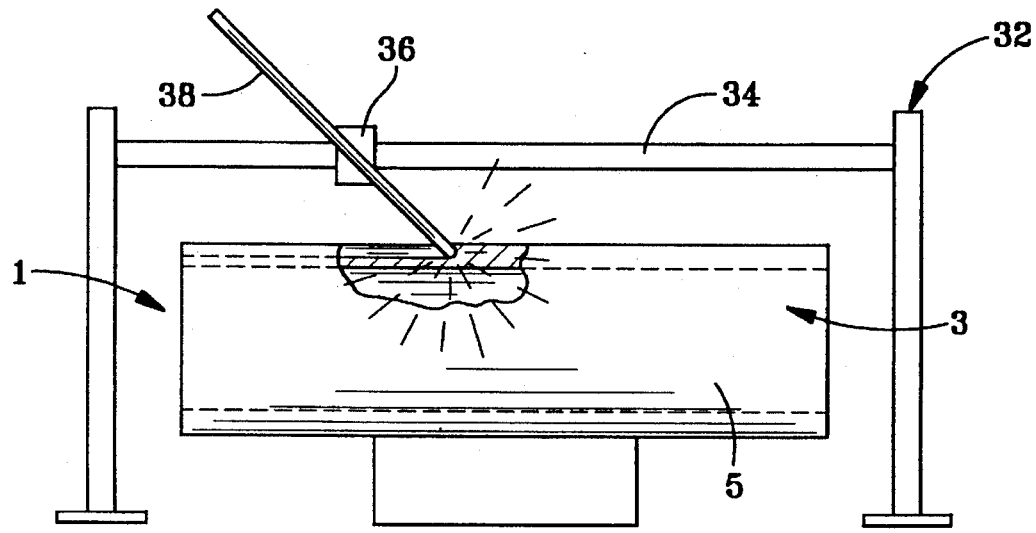
FIG. 7 is a schematic elevational view of a device for producing hardened flutes in kelly bars.

Now referring to FIG. 7, a device is shown schematically for practicing the method of this invention. This method is herein called electric arc gouging.

A kelly bar 1 to be fluted is placed horizontally below a carriage, 32. Carriage 32 has arm 34 extending axially along kelly bar 1. Mounted on arm 34 is a jig 36 that can move axially along arm 34. Jig 36 holds a conventional carbon electrode rod 38. Rod 38 is positioned adjacent outer surface 5. I prefer to position rod 38 at an angle of 45 degrees to the horizontal, and oriented axially along kelly bar body 3. An electrical arc is created between rod 38 and outer surface 5, to form a pool of melted material from body 3. Jig 36 and rod 38 are moved along arm 34, while air is blown against the molten pool of material to maintain the material molten and to blow it away. I prefer air at a standard industrial pressure of 80/90 psi. Other oxygen-containing gases can work, so long as the molten material temperature is maintained (or raised) so as to keep the pool of material molten. The microstructure below bottom surface 15 is cooled rapidly due to the mass of body 3, resulting in the martensitic structure. As the jig 36 and rod 38 move, rod 38 becomes consumed, and it is necessary to continuously adjust the position of rod 38 with respect to outer surface 5. This adjustment can be automated. Before the gouging is begun, kelly bar 1 can be coated with a suitable material to prevent splatter from adhering to the surface of body 3. Material that works is sold by Arcair Company, under the registered trademarks ARCAIR or PROTEX.

I prefer to gouge flutes by using an automatic gouging unit provided by Tweco Products Inc. of Wichita, Kans., under the product designation of N6000 Automatic Gouging Unit.

Upon completion of one flute, the kelly bar 1 is rotated the desired amount, the carbon electrode rod 38 is repositioned next to outer surface 5, and the steps are repeated. Any number of flutes 13 can be so produced. I prefer to move rod 38 axially at a rate of 30 to 45 inches per minute. This compares to a milling rate of 5 inches per minute, providing improved productivity of kelly bars. I prefer to create the electrical arc at about 1100 amps and about 42 volts, but other power settings suitable for electrical arc gouging will work.

Having described the invention, what is claimed is:

1. A method for producing a kelly bar having hardened flutes therein comprising:
   (a) providing a kelly bar having an elongated carbon steel body with an outer surface to be fluted, said body terminating in a first end and a second end, said carbon steel body comprising the following weight percentages of elements: Carbon from 0.28% to 0.33%, Manganese from 0.40% to 0.60% Phosphorus no more than 0.035%, Sulfur no more than 0.040%, Silicon from 0.15% to 0.30%, Chromium from 0.80 to 1.10% Molybdenum from 0.15% to 0.25%; and
   (b) gouging a plurality of flutes in said outer surface with a carbon electrode and an electric arc, each flute extending axially lengthwise along said body substantially the distance between said first and second end, each flute extending radially inwardly into said body and terminating at a curved bottom surface, each flute having a hardened, heat-affected zone beneath said bottom surface, said heat-affected zone comprising finely dispersed martensite.

2. A method for producing a kelly bar having a hardened flute therein comprising:
   (a) providing a kelly bar having a hollow, tubular, elongated carbon steel body with an outer surface to be fluted, said body terminating in a first end and a second end, said carbon steel body comprising the following weight percentage ranges of elements: Carbon from 0.28% to 0.33%, Manganese from 0.40% to 0.60%, Phosphorus no more than 0.035%, Sulfur no more than 0.040%, Silicon from 0.15% to 0.30%, Chromium from 0.80% to 1.10%, Molybdenum from 0.15% to 0.25%;
   (b) positioning a carbon electrode rod adjacent a first position on said outer surface;
   (c) creating an electrical arc between said electrode rod and said outer surface, to form a pool of melted body material;
   (d) blowing an oxygen containing fluid against said pool of melted material to maintain said melted material in a molten state and to remove said melted material; and
   (e) moving said electrode rod and electrical arc axially lengthwise along said body substantially the distance between said first and second end, while blowing said fluid against melted material, to create a flute having a heat-affected zone microstructure extending thereunder, said heat-affected zone comprising finely dispersed martensite.

3. The method of claim 2 further comprising continuously adjusting the position of said electrode rod with respect to said outer surface, as said electrode rod and said electrical arc are moved.

4. The method of claim 2 wherein said fluid is air.

5. The method of claim 3 wherein said kelly bar is positioned in a horizontal position, and said electrode rod is positioned at an angle of about 45 degrees to the horizontal and aligned axially along said body.

6. The method of claim 5 wherein said electrode rod is moved axially at a rate in the range of 30 to 45 inches per minute.

7. The method of claim 6 wherein said electrical arc is produced at about 1100 amps and 42 volts.

8. The method of claim 2 further comprising:
   (a) providing said body with a circular cross section;
   (b) positioning said carbon electrode rod at a second position adjacent said outer surface; and
   (c) repeating steps (c) through (e) of claim 2.

9. The method of claim 8 further comprising:
   (a) positioning said carbon electrode rod at a third position adjacent said outer surface; and
   (b) repeating steps (c) through (e) of claim 2.

* * * * *